United States Patent
Breslow

(10) Patent No.: US 12,032,548 B2
(45) Date of Patent: Jul. 9, 2024

(54) SYSTEM AND METHOD FOR SELF-RESIZING ASSOCIATIVE PROBABILISTIC HASH-BASED DATA STRUCTURES

(71) Applicant: Advanced Micro Devices, Inc., Santa Clara, CA (US)

(72) Inventor: Alexander D. Breslow, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 543 days.

(21) Appl. No.: 16/692,679

(22) Filed: Nov. 22, 2019

(65) Prior Publication Data

US 2020/0167327 A1 May 28, 2020

Related U.S. Application Data

(60) Provisional application No. 62/772,524, filed on Nov. 28, 2018.

(51) Int. Cl.
 *G06F 16/22* (2019.01)
 *G06F 9/50* (2006.01)
 (Continued)

(52) U.S. Cl.
 CPC ........ *G06F 16/2255* (2019.01); *G06F 9/5016* (2013.01); *G06F 16/9014* (2019.01); *G06N 7/01* (2023.01); *G06F 2209/504* (2013.01)

(58) Field of Classification Search
 None
 See application file for complete search history.

(56) References Cited

U.S. PATENT DOCUMENTS 7,019,674 B2 * 3/2006 Cadambi ............. G06F 16/9014
 341/51
8,788,543 B2 * 7/2014 McKenney ......... G06F 12/1018
 707/800

(Continued)

OTHER PUBLICATIONS

Bender, Michael A., et al. "Don't Thrash: How to Cache Your Hash on Flash." PVLDB 5.11 (2012): 1627-1637.

(Continued)

*Primary Examiner* — Polina G Peach
*Assistant Examiner* — Anugeetha Kunjithapatham

(57) ABSTRACT

A method of maintaining a probabilistic filter includes, in response to receiving a key $K_1$ for adding to the probabilistic filter, generating a fingerprint $F_1$ based on applying a fingerprint hash function $H_F$ to the key $K_1$, identifying an initial bucket $B_{i1}$ by selecting between at least a first bucket $B_1$ determined based on a first bucket hash function $H_1$ of the key $K_1$ and a second bucket $B_2$ determined based on a second bucket hash function $H_2$ of the key $K_1$, and inserting the fingerprint $F_1$ into the initial bucket $B_{i1}$; and resizing the probabilistic filter. Resizing the probabilistic filter includes incrementing a resize counter value, determining a bucket B' for the fingerprint $F_1$ based on a value of the fingerprint $F_1$ and the resize counter value, and inserting the fingerprint $F_1$ into the bucket B' in the probabilistic filter.

20 Claims, 7 Drawing Sheets

(51) Int. Cl.
*G06F 16/901* (2019.01)
*G06N 7/01* (2023.01)

(56) References Cited

U.S. PATENT DOCUMENTS

| | | | | |
|---|---|---|---|---|
| 10,346,315 | B2* | 7/2019 | Teotia | G06F 16/2453 |
| 2008/0021908 | A1* | 1/2008 | Trask | G06F 16/9014 |
| 2008/0228691 | A1* | 9/2008 | Shavit | G06F 16/9014 |
| 2012/0166448 | A1* | 6/2012 | Li | G06F 16/11 |
| | | | | 707/747 |
| 2013/0151488 | A1* | 6/2013 | McKenney | G06F 16/9014 |
| | | | | 707/E17.014 |
| 2013/0151489 | A1* | 6/2013 | McKenney | G06F 16/9014 |
| | | | | 707/E17.014 |
| 2014/0214855 | A1* | 7/2014 | Attaluri | G06F 16/2255 |
| | | | | 707/747 |
| 2016/0188623 | A1* | 6/2016 | Finlay | G06F 16/2255 |
| | | | | 707/690 |
| 2017/0068669 | A1* | 3/2017 | Levy | H04L 45/7453 |
| 2017/0286292 | A1* | 10/2017 | Levy | H04L 45/7453 |
| 2018/0341596 | A1* | 11/2018 | Teotia | G06F 12/1018 |
| 2019/0266252 | A1* | 8/2019 | Breslow | G06F 16/2255 |

OTHER PUBLICATIONS

Breslow, Alex D., and Nuwan S. Jayasena. "Morton filters: faster, space-efficient cuckoo filters via biasing, compression, and decoupled logical sparsity." Proceedings of the VLDB Endowment 11.9 (2018): 1041-1055.

Chen, Hanhua, et al. "The dynamic cuckoo filter." 2017 IEEE 25th International Conference on Network Protocols (ICNP). IEEE, 2017.

Fan, Bin, et al. "Cuckoo filter: Practically better than bloom." Proceedings of the 10th ACM International on Conference on emerging Networking Experiments and Technologies. 2014.

* cited by examiner

SYSTEM AND METHOD FOR SELF-RESIZING ASSOCIATIVE PROBABILISTIC HASH-BASED DATA STRUCTURES

RELATED APPLICATIONS

This application claims priority to U.S. Provisional Application No. 62/772,524, filed on Nov. 28, 2018, which is incorporated by reference herein in its entirety. U.S. patent application Ser. No. 16/104,662, filed on Aug. 17, 2018 and entitled "Cuckoo Filters and Cuckoo Hash Tables with Biasing, Compression, and Decoupled Logical Sparsity" is incorporated by reference herein in its entirety.

BACKGROUND

Approximate set membership data structures (ASMDS) are deployed in a wide variety of computing applications including, for example, computer networking, database systems and DNA sequencing systems. They also are commonly employed in computer processors to filter requests when storing an explicit representation of a set would be costly or prohibitively expensive. Similar to a set membership structure, an ASMDS answers set membership queries, confirming or denying the existence of an element in a set. In a typical ASMDS, a key can be added as an element in the set by inserting a hash of the key in the data structure. Subsequently, a hash of a queried key can be calculated and compared with the previously stored hash to determine whether the key is a member of the set. While an explicit set membership structure does not report false positives or false negatives, an ASMDS is able to report false positives (due to hash collision) but does not report false negatives. As such, an ASMDS is able to report whether a queried element is most likely in the set, or definitely not in the set.

The most common ASMDS is the Bloom filter, which in its simplest form supports insertions and lookups, but lacks a deletion operation. Deletions and counting occurrences of elements are supported via a number of different Bloom filter variants, albeit with an increase in the storage cost, where a 2× to 4× increase is not uncommon. The simplest form of Bloom filter also exhibits poor locality of reference, and more cache-friendly blocked variants are typically less space efficient. Alternative ASMDS filters, such as quotient filters and cuckoo filters have been proposed to address the shortcomings of the Bloom filter. These alternative filters support deletions and, when filled to high load factors (e.g., 95% full) use less space than a comparable Bloom filter; however, insertion throughput in these filters can decrease substantially as the filter is filled.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

A cuckoo filter is a probabilistic filter (i.e., an approximate set membership data structure (ASMDS)) that is logically organized as a matrix, in which rows are called buckets and cells within each row are called slots. Each slot can store a single fixed-width hash known as a fingerprint, which encodes the membership of a single item (i.e., a key) within the set. The cuckoo filter is associated with a set of two or more hash functions which are each used to calculate a different bucket index based on a key. Each fingerprint is thus remappable to a fixed number of buckets equal to the number of hash functions in the set.

Figure 1A:
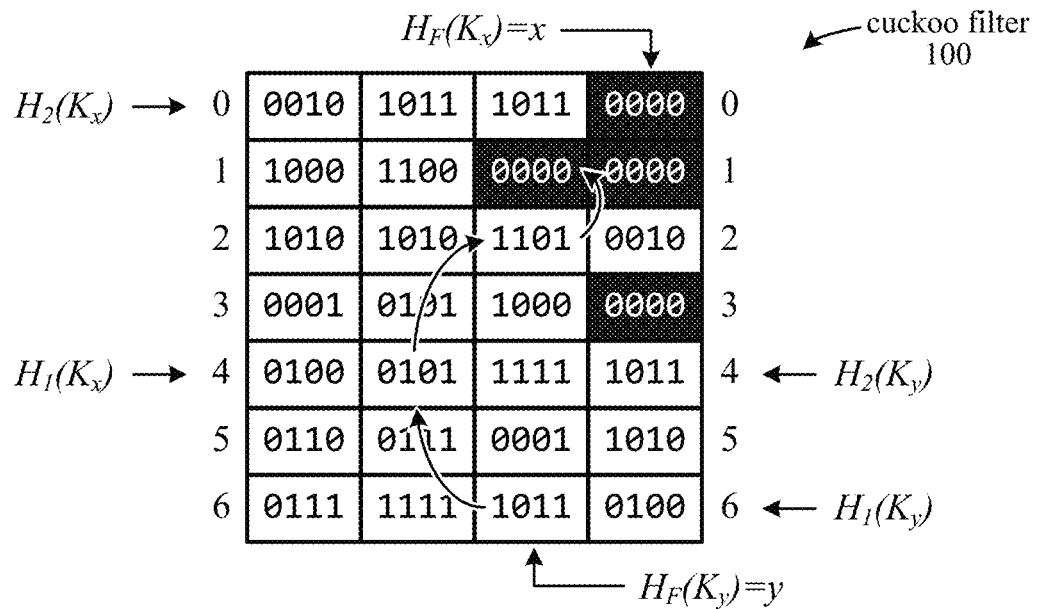
FIGS. 1A and 1B illustrate an embodiment of a cuckoo filter.
Figure 1B:
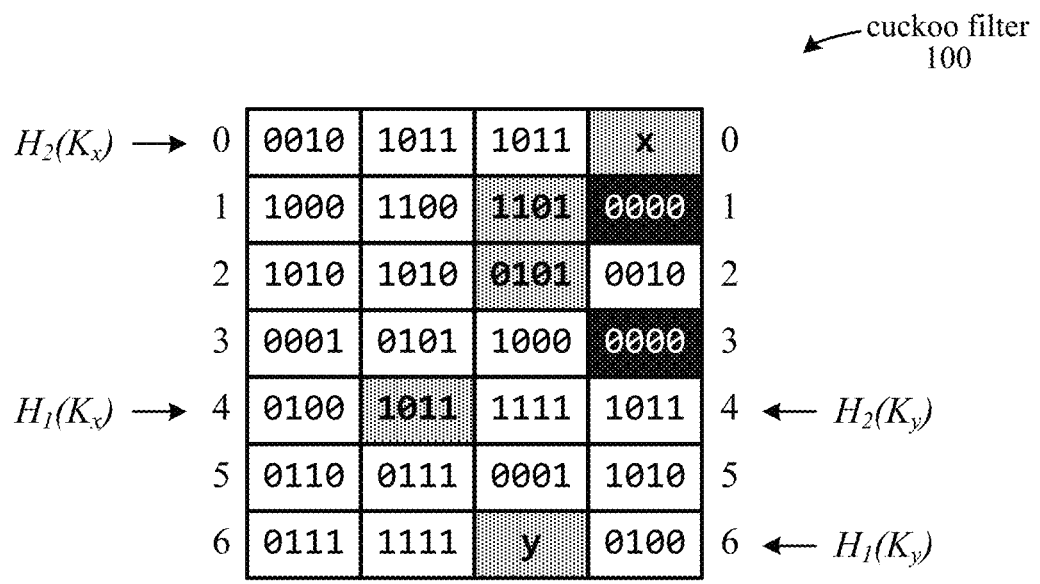

FIGS. 1A and 1B illustrate an embodiment of a cuckoo filter 100 having seven buckets, with four slots in each bucket, and two hash functions $H_1(K)$ and $H_2(K)$ for calculating candidate buckets for a key K. FIGS. 1A and 1B illustrate a process for inserting keys $K_x$ and $K_y$ into the cuckoo filter 100 by inserting each of their respective fingerprints x and y into one of their candidate buckets.

Fingerprint x is calculated from $H_F(K_x)$ (i.e., by executing the hash function $H_F$ on the key $K_x$). The candidate buckets 4 and 0 for $K_x$ are calculated from $H_1(K_x)$ and $H_2(K_x)$, respectively. Of the candidate buckets 4 and 0, bucket 4 is full, while bucket 0 has an empty slot (containing the value '0000'). Therefore, fingerprint x is inserted into the available slot in bucket 0.

For key $K_y$, fingerprint y is calculated from $H_F(K_y)$ and its candidate buckets 6 and 4 calculated from $H_1(K_y)$ and $H_2(K_y)$, respectively. Neither of the candidate buckets 6 and 4 has spare capacity; thus, cuckoo hashing is performed, in which a series of displacements is made to accommodate the new fingerprint. The new fingerprint y displaces an existing fingerprint '1011' in bucket 6, which is moved to its alternate bucket 4, displacing another fingerprint '0101' in bucket 4. Each of the displaced fingerprints (i.e., '1011' in bucket 6, '0101' in bucket 4 and '1101' in bucket 2) is moved in turn to its alternate bucket until a displaced fingerprint can be moved to an empty slot. In this case, '1101' is moved from bucket 2 to an empty slot in its alternate bucket 1.

FIG. 1B illustrates the cuckoo filter table 100 after the keys $K_x$ and $K_y$ have been added. To subsequently determine whether $K_x$ is in the set, the candidate buckets for $K_x$ (i.e., buckets 4 and 0) are calculated from $H_1(K_x)$ and $H_2(K_x)$, respectively. Accordingly, the fingerprints in buckets 4 and 0 are compared with the fingerprint x for key $K_x$, which is again calculated using the fingerprint hash function $H_F(K_x)$.

If x is found in either of the candidate buckets 0 or 4, then $K_x$ is determined to be likely in the set. However, if x is not found in either of the candidate buckets, then $K_x$ is determined not to be in the set. Similarly, the presence of $K_y$ in the set is likely if the fingerprint y calculated from $H_F(K_y)$ is found in either of the candidate buckets 6 and 4, calculated from $H_2(K_y)$ and $H_1(K_y)$.

In one embodiment, a Morton filter is a cuckoo filter that is stored in a compressed format to consume less storage space and also achieve faster speeds for operations such as lookups, insertions, and deletions. In the compressed representation, empty entries are not stored; instead, the number of occupied slots is stored for each bucket in the data structure in a fullness counter array. In one embodiment, in-situ reads and updates are performed directly on the compressed representation. In contrast with other types of ASMDS, such embodiments of a compressed cuckoo filter support deletions and counting of added keys without a drastic increase in memory usage.

In one embodiment, $H_F$ is the identity function (i.e., the key itself is stored in the filter) or a function that truncates redundant bits in the key such that a portion of the key is stored in the filter. In this case, the filter functions as a hash table. In some embodiments, fingerprints stored in the filter are augmented with metadata, allowing implementation of hash maps, fine-grained data structure versioning, and concurrency, among other features.

Figure 1C:
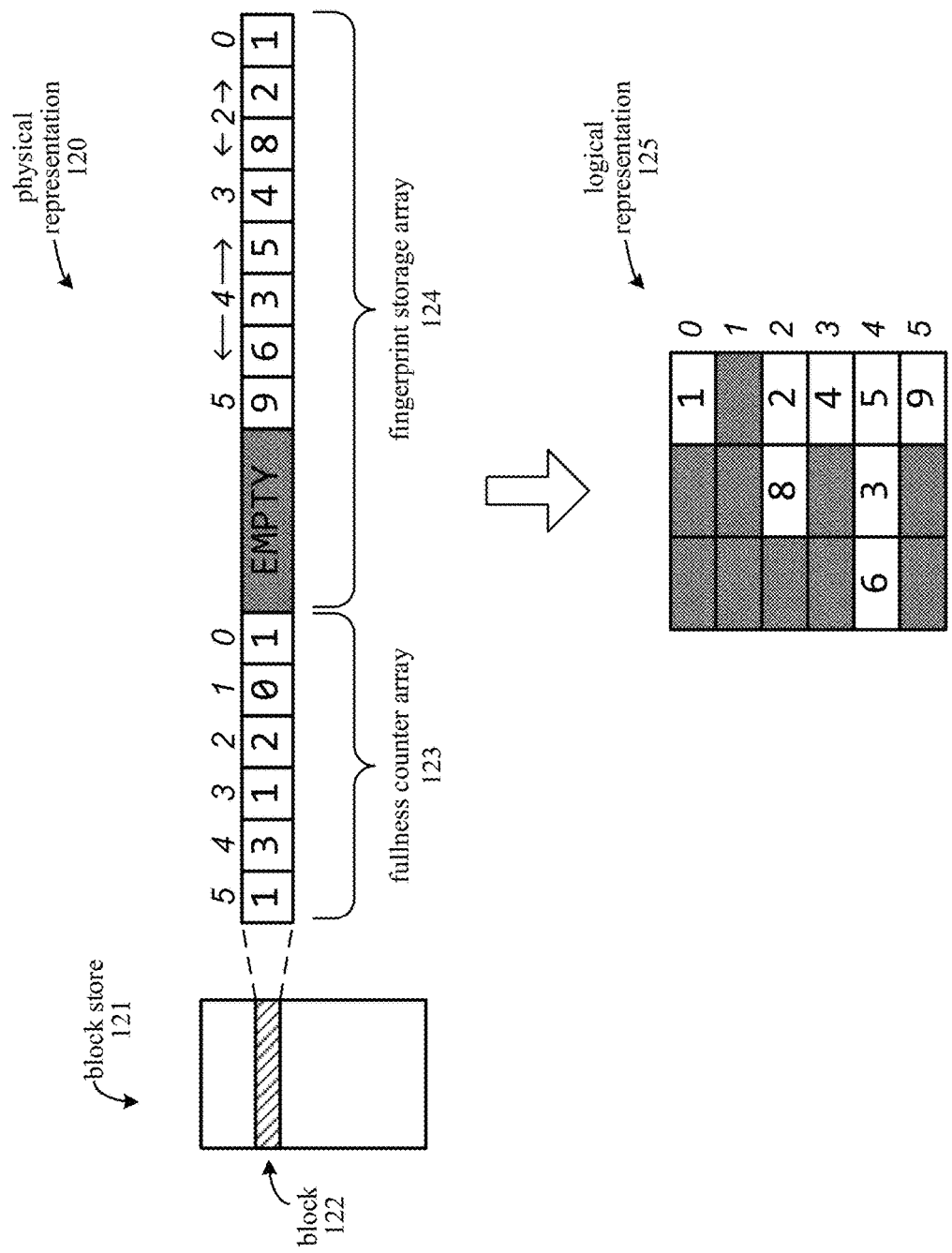
FIG. 1C illustrates fingerprints stored in a compressed cuckoo filter, according to an embodiment.

FIG. 1C illustrates an approach for storing a compressed cuckoo filter in memory, according to an embodiment. In the physical representation 120 of the compressed cuckoo filter, the compression is achieved by storing the contents of occupied slots, without storing the empty slots. Instead of being explicitly stored, empty slots are instead encoded by a smaller count value that is equal to the number of occupied slots in its corresponding bucket. This compression format allows for a logically underloaded table to make efficient use of memory and to reduce both the number of slots per bucket and the number of buckets that are checked for each lookup. Larger buckets having a greater number of slots per bucket are also accommodated without greatly increasing the number of bits per item in the table.

As illustrated in FIG. 1C, the physical representation 120 of the compressed cuckoo filter is stored in a block store 121, which is a region in the physical memory. The blocks (e.g., block 122) in the block store 121 are sized subject to a low-level hardware parameter, even divisions of a hardware cache line, a physical page, or a solid-state drive (SSD) block.

Each block in the block store 121 stores a fixed number of compressed buckets along with their portion of the FCA 123. In this example, each block stores 6 count values in the FCA 123 and thus encodes 6 logical buckets, having indexes from 0-5. The FSA portion 124 stores the entries for the set of six buckets. Each of the count values and entries in the physical representation 120 is labeled above with its associated bucket. In both of the arrays 123 and 124, the count values or entries associated with lower-indexed buckets are located nearer to the least significant bit of the block than any count values or entries associated with higher-indexed buckets.

The logical representation 125 shows the contents of the block 122 in a logical table form. Each of the buckets 0-5 is illustrated as a row in the table, with the cells in each row representing slots. To the right of each row is a bucket index identifying the bucket represented by the row. The entries in the FSA 124 are shown as being located in the rows representing their respective buckets in the representation 125. Within the FCA portion 123, each count value has the same index as its associated bucket, and stores a count value indicating how many slots in the associated bucket are occupied.

In one embodiment, a Morton filter or cuckoo filter supports resizing by a power of two without accessing the original source data (i.e., the original keys from which fingerprints are computed). Resizing of the filter is thus supported for applications where there is significant cost to accessing the original data, or where accessing the original data is infeasible because the data no longer exist or their precise location is unknown. The approach described herein for resizing Morton filters and other types of cuckoo filters overcomes several challenges. For example, the value of a fingerprint in a cuckoo filter does not indicate whether the fingerprint was placed in its primary or secondary candidate bucket. Furthermore, in a Morton filter, the number of buckets is not required to be a power of two; thus, the resizing mechanism supports resizing of filters having a non-power of two number of buckets in the original filter. Also, for Morton filters, preserving the block-level structures such as the FCA, FSA, and OTA is non-trivial when the filter is resized.

In one embodiment, the resizing process addresses these issues by maintaining a counter R that stores the number of times the filter's capacity (contained in the filter's block store) has been doubled. A value of R=0 indicates that the filter's capacity is at its original size. A value of R=3 means that the filter has 8 times more buckets than were originally allocated. The resize counter value R is incremented for each resizing operation in which the filter's capacity is doubled, and decremented for each resizing operation in which the filter's capacity is halved. For lookups, insertions, and deletions, R is used to scale the global bucket indexes back and forth between their values in the original size block store and resized versions of the block stores. The resizing mechanism thus maintains multiple views of the filter, with each view corresponding to one of the different sized versions of the filter.

In one embodiment, the resizing mechanism is able to resize a Morton filter or cuckoo filter even when the original source data for the fingerprints are unavailable, and when the original table does not contain a power of two number of buckets. Insertions and deletions can still be performed after resizing, and the resizing approach also works with set associative data structures such as Morton filters. In the computing system, the filter's ability to self-resize is useful for adapting to unexpected load or skew. For instance, the filter can be sized optimistically at the outset to accommodate a common case for an application rather than a seldom-observed, pessimistic tail case that may result in significantly oversizing the filter. Since small filters occupy less space, operations on small filters are typically faster because they are often easier to cache closer to the processing unit.

In one embodiment, the resizing mechanism additionally avoids costly lookups that result from other resizing strategies, such as chaining or linking additional memory capacity to the original filter (resulting in lookup operations potentially traversing a long chain of pointers). Instead, each lookup of a key in the resized filter entails checking two possible buckets for the key's fingerprint. Thus, lookups and other filter operations are easily vectorized using single-instruction multiple data (SIMD) instructions. The resizing mechanism also avoids costly collision handling (e.g., by linear probing) during the resizing process, since each new child bucket in the expanded filter deterministically receives equal or fewer fingerprints from its original parent bucket.

In one embodiment, a resizable Morton filter or cuckoo filter is used in network routing hardware. Such a router maintains a routing table associating network destinations with routing information. The routing table is partially cached in faster memory, along with a cuckoo filter into which the cached destinations are added. The cuckoo filter is then used to determine whether a lookup should be performed in the cached portion of the routing table or the full routing table. In this case, the filter is resizable to accommodate changing network conditions while still providing fast lookup performance for routing network traffic.

Figure 2:
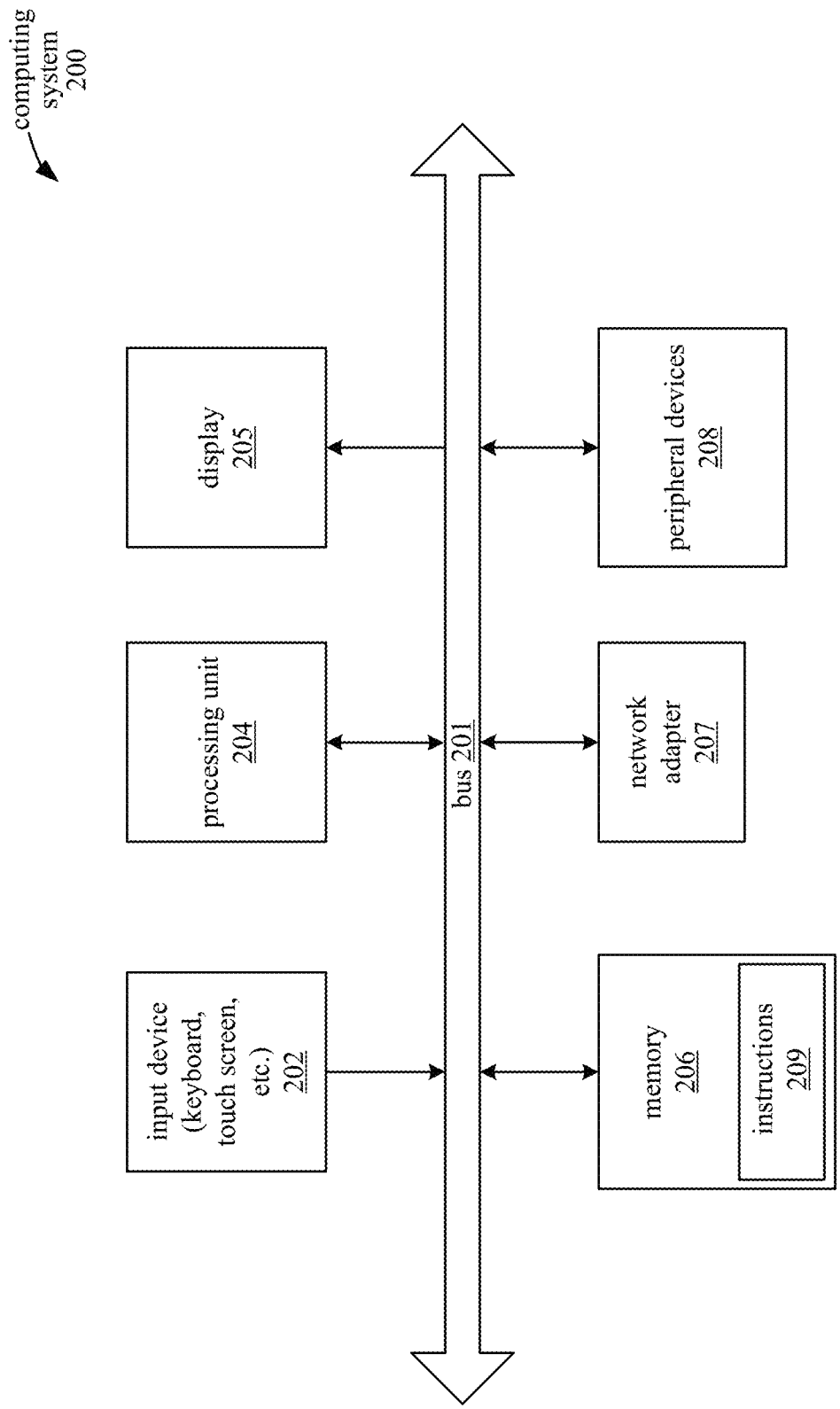
FIG. 2 illustrates a computing system, according to an embodiment.

FIG. 2 illustrates an embodiment of a computing system 200 in which the above approach for resizing a cuckoo filter is implemented. In general, the computing system 200 is embodied as any of a number of different types of devices, including but not limited to a laptop or desktop computer, mobile device, server, network switch or router, etc. The computing system 200 includes a number of components 202-208 that communicate with each other through a bus 201. In computing system 200, each of the components 202-208 is capable of communicating with any of the other components 202-208 either directly through the bus 201, or via one or more of the other components 202-208. The components 201-208 in computing system 200 are contained within a single physical enclosure, such as a laptop or desktop chassis, or a mobile phone casing. In alternative embodiments, some of the components of computing system 200 are embodied as peripheral devices such that the entire computing system 200 does not reside within a single physical enclosure.

The computing system 200 also includes user interface devices for receiving information from or providing information to a user. Specifically, the computing system 200 includes an input device 202, such as a keyboard, mouse, touch-screen, or other device for receiving information from the user. The computing system 200 displays information to the user via a display 205, such as a monitor, light-emitting diode (LED) display, liquid crystal display, or other output device.

Computing system 200 additionally includes a network adapter 207 for transmitting and receiving data over a wired or wireless network. Computing system 200 also includes one or more peripheral devices 208. The peripheral devices 208 may include mass storage devices, location detection devices, sensors, input devices, or other types of devices used by the computing system 200.

Computing system 200 includes a processing unit 204. The processing unit 204 receives and executes instructions 209 that are stored in a memory system 206. In one embodiment, the processing unit 204 includes multiple processing cores that reside on a common integrated circuit substrate. Memory system 206 includes memory devices used by the computing system 200, such as random-access memory (RAM) modules, read-only memory (ROM) modules, hard disks, and other non-transitory computer-readable media.

Some embodiments of computing system 200 may include fewer or more components than the embodiment as illustrated in FIG. 2. For example, certain embodiments are implemented without any display 205 or input devices 202. Other embodiments have more than one of a particular component; for example, an embodiment of computing system 200 could have multiple processing units 204, buses 201, network adapters 207, memory systems 206, etc.

Figure 3:
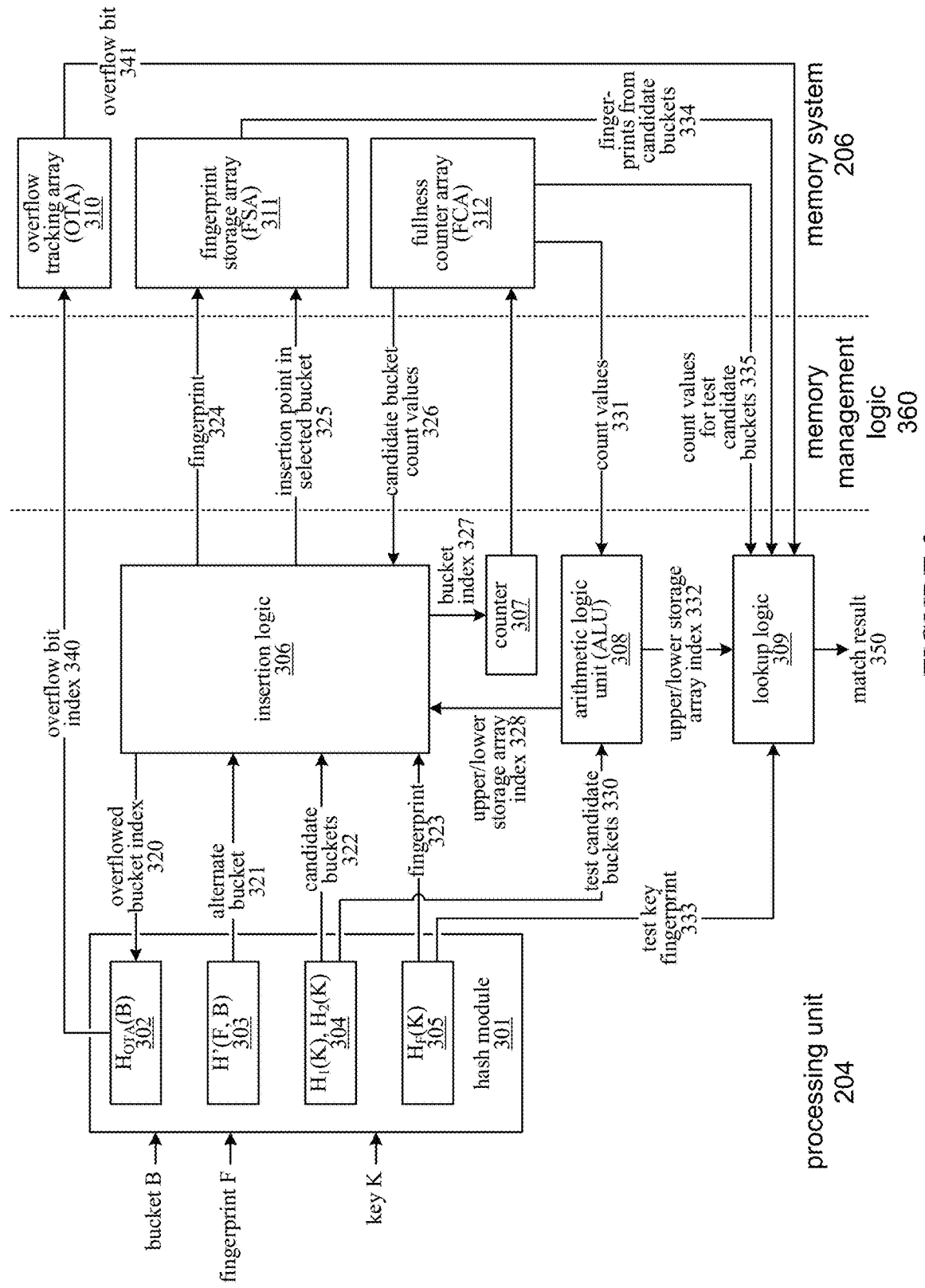
FIG. 3 illustrates components in a processing unit and a memory system in a computing device, according to an embodiment.

FIG. 3 is a block diagram illustrating devices in the computing system 200, including the processing unit 204 and the memory system 206, according to an embodiment.

The components illustrated in FIG. 3 include various modules that are implemented as circuitry (e.g., circuit modules), programmable logic, software, or a combination of hardware and software components. The processing unit 204 accesses data stored in the memory system 206 via memory management logic 360. The memory management logic 360 includes logic circuitry and/or software for implementing functions of the memory management unit (MMU) and memory controller (e.g., virtual memory address to physical memory address translation, memory allocation, managing memory requests, etc.), and in alternative embodiments is integrated in the processing unit 204 die, in a memory device in the memory system 206, or as a separate unit.

Memory system 206 includes multiple arrays that make up the Morton filter; these include a fingerprint storage array (FSA) 311, a fullness counter array (FCA) 312, and an overflow tracking array (OTA) 310. The FSA 311 stores a sequence of entries, where each entry includes a fingerprint for a key. In alternative embodiments, each entry in the storage array 311 stores a different type of data value instead of or in addition to a fingerprint, such as key-value pairs, single data items (i.e., keys without values), data structures, pointers to data structures, metadata, etc. In the FSA 311, the order of the sequence of the entries corresponds to the order of a set of buckets (each bucket is associated with an index value indicating its ordinal position in the set of buckets). Accordingly, the position of each entry in the sequence can be used to determine the bucket in which the entry is located using count values that indicate the number of entries in each bucket. For each bucket in the data structure, a count value indicating the number of entries in the bucket is stored in the fullness counter array (FCA) 312. The FCA 312 stores the count values in an order corresponding to the sequential order of their respective buckets. The overflow tracking array (OTA) 310 stores overflow bits indicating whether each bucket has overflowed (i.e., a maximum number of entries that can be stored in the bucket has been exceeded).

The processing unit 204 includes a hash module 301, insertion logic 306, counter 307, arithmetic logic unit (ALU) 308, and lookup logic 309. Each of these components is implemented using logic circuits and memory circuits in the processing unit 204. In alternative embodiments, the modules are implemented in software or a combination of hardware and software elements.

The hash module 301 includes logic for performing a number of different types of hash operations, including bucket hashes $H_1(K)$ and $H_2(K)$ 304, a fingerprint hash $H_F(K)$ 305, an alternate bucket hash $H'(F, B)$ 303, and an overflow tracking hash $H_{OTA}(B)$ 302. In this section, K, F, and B are used to generically refer to any key, fingerprint, and bucket, respectively, on which the hash functions 302-305 operate. The bucket hashes 304 include a first hash function $H_1(K)$ that computes for a key K a first candidate bucket from the set of buckets. The hash module 301 receives each key K to be added to the set (or tested for membership in the set), and executes the first bucket hash $H_1(K)$ on the key K to identify a first candidate bucket in which the key K could possibly be stored (or found, when testing membership of the key K). The second bucket hash function $H_2(K)$ operates in a similar manner as $H_1(K)$ to calculate a second candidate bucket in which the key K could be stored or found.

The hash module 301 also includes logic for calculating a fingerprint for each key K using a fingerprint hash $H_F(K)$ 305. The fingerprint hash 305 is used to compute a fingerprint for each key K to be added to the set or checked for membership in the set. The key K is added to the set by inserting the fingerprint for the key K as an entry in the sequence of entries in the FSA 311, in a position corresponding to one of the candidate buckets calculated from the bucket hashes 304.

The insertion logic 306 performs operations for adding each key K to the filter. For each key K, the insertion logic 306 receives the candidate buckets 322 calculated from the bucket hashes 304 and the fingerprint 323 calculated from the fingerprint hash 305. The insertion logic 306 selects one of the candidate buckets 322 and inserts the fingerprint 323 as an entry in the sequence of entries in the FSA 311, in a position that corresponds to the selected candidate bucket. The insertion logic 306 thus stores each of the entries in the FSA 311. This sequence of entries is stored in a compressed form at contiguous memory locations in the same region of the memory system 206. In alternative embodiments, the entries are stored in deterministic locations in the memory region that are noncontiguous. For example, in such embodiments, the storage locations are permuted, or spacer bits or fields are placed between the entries.

When performing an insertion, the insertion logic 306 selects one of the candidate buckets 322 that has an empty slot available for storing the new fingerprint. Whether or not a candidate bucket has empty slots is determined based on the count values 326 for the candidate buckets from the FCA 312. For example, in response to determining that the first candidate bucket is full, the insertion logic 306 selects the second candidate bucket as the selected bucket if the second candidate bucket has an empty slot.

However, if both of the candidate buckets 322 are full (i.e., do not have any empty slots), the insertion logic 306 relocates an entry from one of the candidate buckets 322 to that entry's alternate bucket to vacate a slot for the new fingerprint entry. For example, in response to determining that both of the first bucket and the second bucket are full, the insertion logic 306 relocates another entry from the first bucket to its alternate bucket, then selects the first bucket for storing the new fingerprint entry. The alternate bucket hash H'(F, B) 303 is executed on the fingerprint F being relocated and its bucket B to compute the alternate bucket 321 for the fingerprint F. The insertion logic 306 receives the alternate bucket 321 index and relocates the fingerprint to the alternate bucket 321. This process repeats for each fingerprint that is relocated, until a fingerprint is stored in an already empty slot.

The insertion logic 306 also outputs an overflowed bucket index 320 for each bucket from which an entry is relocated. For each of these overflowed buckets, the insertion logic 306 has attempted to insert a fingerprint when the bucket was already full. Accordingly, the insertion logic 306 transmits the bucket index 320 for each overflowed bucket to the hash module 301, which uses the overflowed bucket index 320 as a bucket B for calculating an overflow bit index 340 using the overflow tracking hash $H_{OTA}(B)$ 302. In various embodiments, the overflow tracking hash $H_{OTA}(B)$ 302 is a function of the bucket B, fingerprint F, or both. The overflowed bucket index 320 identifies a bit to assert in the overflow tracking array 310, which can be subsequently referenced to determine whether the bucket had previously overflowed.

For each fingerprint that is added to a bucket in the FSA 311, the insertion logic 306 transmits an index 327 of the bucket to a counter 307, which increments a count value corresponding to the bucket and writes the count value in the FCA 312. The counter 307 thus maintains a running count of the number of entries in each bucket; each bucket is associated with its own count value in the FCA 312 that indicates the number of entries in the bucket. The set of count values is stored in the FCA 312 in an order corresponding to the sequential order of the buckets.

When performing an insertion of a new entry in the sequence of entries, the insertion logic 306 determines where in the sequence to insert the new entry based on an upper and/or lower storage array index 328 that is calculated by the arithmetic logic unit (ALU) 308 based on one or more consecutive count values 331 from the FCA 312. In particular, the ALU 308 sums the consecutive count values 331, which correspond to the consecutive buckets preceding the selected candidate bucket in the sequence of buckets. In one embodiment, the bucket index is used to reference the corresponding count value for the bucket in the FCA 312, such that each of the count values that are summed has a lower index in the FCA 312 than the count value for the selected candidate bucket. The ALU 308 similarly calculates an upper storage array index for the selected candidate bucket by adding one less than the count value of the selected bucket to the previously calculated lower storage array index. The upper and/or lower storage array indexes 328 indicate the range of positions in the sequence of entries that corresponds to the selected candidate bucket. Accordingly, the insertion logic 306 inserts the new entry adjacent to one of these entries in the FSA 311 in order to write the entry in the selected candidate bucket. The insertion logic 306 provides the new fingerprint entry 324 and indicates the insertion point 325 (i.e., address) in the selected candidate bucket to the memory 206, and the fingerprint 324 is stored at the indicated insertion point 325 in the FSA 311.

In one embodiment, the insertion logic 306 resizes the filter in response to any of several possible conditions, such as reaching or approaching a capacity limit for the filter's block store, predicting an increase in insertions, etc. Each resizing operation increases the capacity of the filter by a factor r, where r is a power of 2. The value of the resize factor r is thus expressible as $2^R$, where R is an integer representing the resize counter value. R can be positive (when the filter is increased from its original size) or negative (when the filter is decreased from its original size). The original size of the filter thus corresponds to a value of R=0. With reference to a particular resize operation, a parent filter or block refers to a version of the filter or block existing prior to the resize operation, upon which the resize operation is performed. A child filter or block is the result of the resize operation and contains the information (fingerprints, etc.) that was previously contained in the parent filter or block.

When a resize operation doubles the filter capacity, each block in the parent filter is the sole parent of two child blocks in the resized child filter. The fingerprints of the parent block are distributed among the two new child blocks. The block-local bucket indices of a fingerprint (including one index for each candidate bucket) are not changed by the resizing process. In addition, the child blocks are adjacent to each other in the new block store (e.g., a parent block 5 would be resized into two adjacent child blocks 10 and 11), which preserves memory performance due to locality. Also during the resizing process, an FCA is created for each of the new child blocks, and the OTA of the parent block is copied to each child block.

Table 1 provides a pseudocode routine for increasing a Morton filter's capacity by a non-negative integral power of two resize factor r, according to an embodiment.

TABLE 1

Resize routine

```
1:  function increaseCapacity(MF, r)
2:      oldBS = MF.BlockStore // pointer
3:      newBS = malloc(r * MF.BlockStore.size)
4:      for (bID = 0; bID < MF.totalBlocks; bID ++) do
5:          fsaIdx = 0 //Tracks reading in parent FSA
6:          fsaPtrs[r]{ } //Tracks writing in r child FSAs
7:          for (lbi = 0; lbi < B; lbi ++) do
8:              fullSlots = MF.BlockStore[bID].FCA[lbi]
9:              for (sID = 0; sID < fullSlots; sID ++) do
10:                 F = oldBS[bID].FSA[fsaIdx]
11:                 fsaIdx ++
12:                 lsbM = r − 1 //For mod r
13:                 child = (F >> (f − R − log₂(r)))&lsbM
14:                 childBID = r * bID + child
15:                 newBS[childBID].FSA[fsaPtrs[child]] = F
16:                 fsaPtrs[child] + +
17:                 newBS[childBID].FCA[lbi] + +
18:         for (child = 0; child < r; child ++) do
19:             childBID = r * bID + child
20:             newBS[childBID].OTA = old BS[bID].OTA
21:     R+ =log2(r)
22:     MF.BlockStore = newBS
23:     dealloc(oldBS)
```

The function increaseCapacity(MF, r) (line 1) increases the capacity of a Morton filter MF by the factor r. Line 2 sets a pointer oldBS to refer to the block store MF.BlockStore of the parent filter MF. At line 3, memory capacity is allocated for the block store of the child filter. An amount of memory r times the size MF.BlockStore.size of the parent block store is allocated.

Lines 4-20 iterate through each block index bID in the parent filter MF. Lines 5 and 6 declare pointers for reading fingerprints sequentially from the parent FSA and for writing fingerprints in the r child FSAs, respectively. In lines 7-17, the routine iterates through each local bucket index lbi in the parent block bID to distribute the fingerprints from the bucket lbi into their corresponding buckets in the appropriate child block. In line 7, B is the number of total buckets in each block. At line 8, the routine checks the FCA for the block bID; fullSlots is the entry from the FCA for the bucket lbi that indicates how many slots in the bucket lbi are occupied by fingerprints.

At lines 9-17, for each of the slots that contains a fingerprint, the routine obtains the original fingerprint F (line 10) from the fingerprint storage array FSA of the old block store oldBS. The FSA index fsaIdx is incremented at line 11 so the next fingerprint in the FSA will be processed at the next iteration. At line 12, the least significant bit mask lsbM is calculated by subtracting 1 from the resize factor r. For example, a resize factor of 4 (0b100) results in a lsbM of 3 (0b011). At line 13, a child number child is calculated based on the fingerprint F. A subset of the bits in the fingerprint F is used to determine which of the r child blocks will receive the fingerprint F. For example, if the resize factor r is 4, then each parent block has 4 child blocks, and child can be 0, 1, 2, or 3. At line 13, F>>(f−R−log₂(r)) shifts off the least significant bits of the fingerprint that will not be used to determine the child block, where f is the number of bits in the fingerprint. For example, when f=8 bits per fingerprint, R=1 (indicating that the filter size has already been doubled once), and r=4 (indicating that the filter is currently being resized by a factor of 4), then the fingerprint F is right bit-shifted by 5 bits. The result is masked by a bitwise AND operation with the mask lsbM, and the result of this AND operation is the child number child. At line 14, the parent block identifier bID is scaled by the resize factor r and added to the child number child to compute the child block identifier childBID into which the fingerprint F will be stored.

The fingerprint F is inserted in bucket lbi in the child block childBID at line 15. Thus, F has the same block local bucket index in the child block as it had in the parent block. Since fingerprints stored in the FSA of a Morton filter are serialized, the slot in the child FSA where the next fingerprint will be written is determined by incrementing the pointer at line 16. Line 17 increments the FCA for the bucket lbi in the child block, since a fingerprint was added to the bucket at line 15. Lines 4-20 thus iterate through each fingerprint in the parent block store to copy all of the fingerprints from the parent blocks into corresponding buckets in their appropriate child blocks.

In lines 18-20, the OTA is copied from the parent block bID to each of its child blocks. At line 21, the resize counter value R is incremented by the log base 2 of r; thus, each increment of R represents a doubling in size of the filter capacity. Upon reaching line 22, all of the fingerprints have been moved from the parent block store to the new resized child block store, so the pointer MF.BlockStore is changed to point to the new block store location newBS so applications can access the resized child block store when accessing the filter. At line 23, the old block store is deallocated to free its memory capacity.

Figure 4:
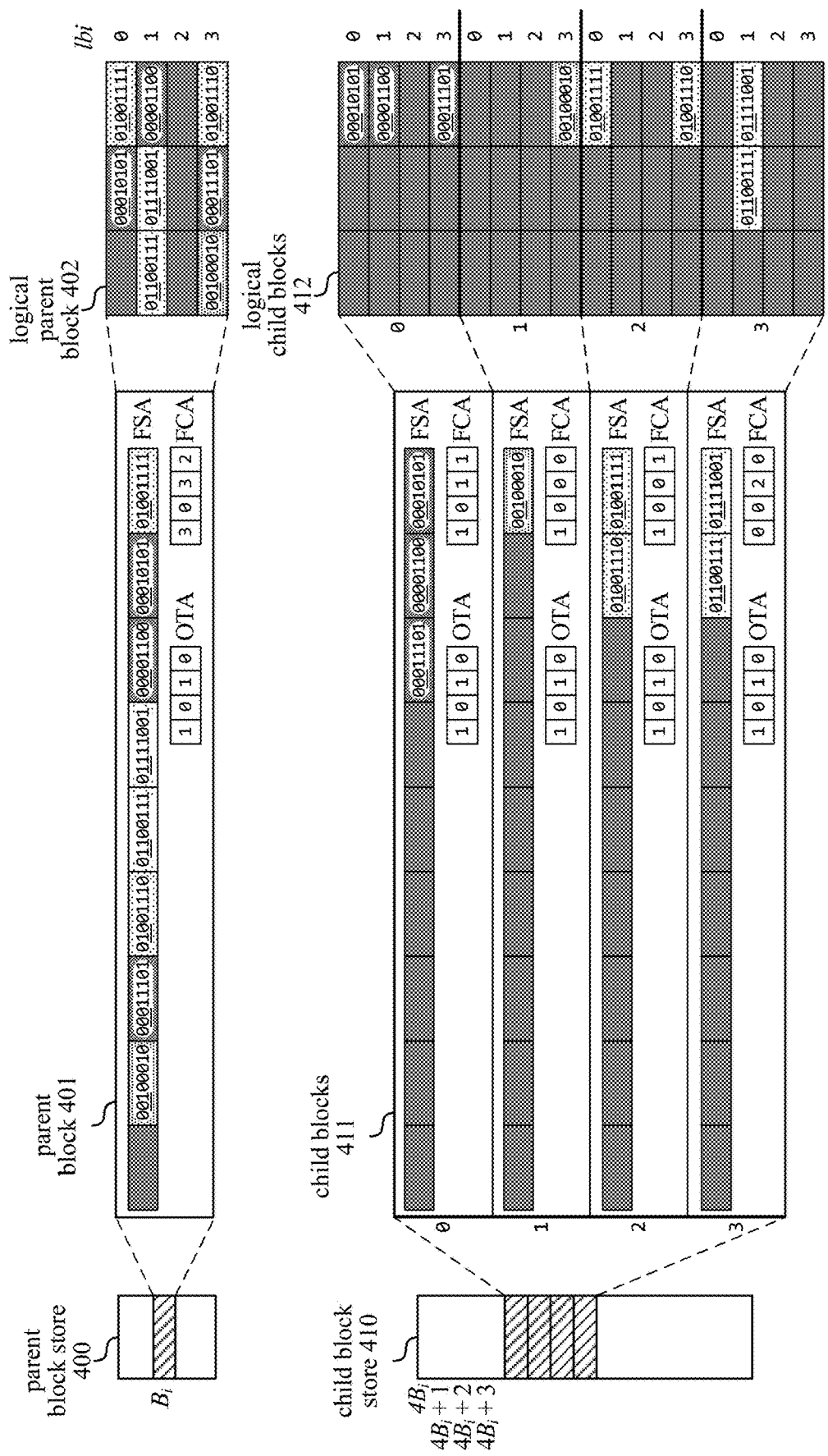
FIG. 4 illustrates resizing of a probabilistic filter, according to an embodiment.

FIG. 4 illustrates the resizing of a Morton filter that was previously resized, according to an embodiment. The Morton filter includes a parent block store 400, which contains a parent block 401 to be resized into a larger child block store 410. FIG. 4 also illustrates respective logical views 402 and 412 of the parent block 401 and the child blocks 411. The parent block 401 includes a portion of the fingerprint storage array (FSA) and is associated with an overflow tracking array (OTA) and fullness counter array (FCA). As illustrated, the filter has been previously doubled in capacity from its original size, and is currently being resized to quadruple its present capacity. That is, the resize counter value R is changing from R=1 to R=3. The parent block 401 contains a number of fingerprints for which the original data is inaccessible; thus, each fingerprint from the parent block 401 is sorted into one of the child blocks 411 based on a subset of its own bits.

Since the filter has already been resized once, the first most significant bit was already used to sort the fingerprints into child buckets. Accordingly, each fingerprint in the parent block 401 (which was a child block in the prior resizing) was previously sorted into the parent block 401 because of its first most significant bit of '0'. Bits that were already used for sorting fingerprints are not reused in subsequent resizing operations; accordingly, this first most significant bit is not reused for sorting fingerprints in the present resizing operation.

For the present resizing operation, the second and third most significant bits of each fingerprint are used to determine into which child block the fingerprint will be moved. These bits are selected by line 13 in Table 1, in which the 5 least significant bits are removed via right-shifting by f−R−log₂(r). The remaining bits are masked by a bitwise AND operation with the least significant bit mask lsbM (determined in line 12 of Table 1). The result of the masking operation is the child number child.

For example, for the leftmost fingerprint 0b00100010 in the parent block 401, f−R−log₂(r) is 8−1−log₂(4)=5. Thus, the fingerprint is right shifted by 5 bits, resulting in a value of 0b001. The least significant bit mask lsbM is (r−1)= (4−1)=3, or 0b011. Masking the remaining bits from the fingerprint with lsbM results in a child number of 0b001. The fingerprint 0b00100010 is therefore placed in child block 1, as shown in FIG. 4. The fingerprint is placed in bucket 3 of child block 1 since it was stored in bucket 3 of the parent block 401. The other fingerprints in the parent block are similarly sorted into the child blocks 0, 1, 2, and 3 based on their second and third most significant bits (underlined) identifying their respective child blocks. In alternative embodiments, the least significant bits are used instead of the most significant bits of the fingerprint, with each bit in the fingerprint being used no more than once for identifying a child block.

During the resizing operation, R contiguous bits of the original fingerprint are used to compute the new block and global bucket index for storing the fingerprint in the resized filter. Thus, for each fingerprint that has been previously sorted into a child block due to a resizing operation, the bits used to sort the fingerprint are redundantly encoded in the fingerprint's containing block. In one embodiment, these used bits are shifted off to save space; alternatively, the fingerprint is left unmodified when the fingerprint is stored in the new resized filter. Leaving the fingerprints unmodified allows child blocks to maintain the same format as their parent. Further, C++ templating can be used to enhance compile-time optimization and specialization. For the latter approach, the compiler need not be instructed to generate multiple different code variants for every conceivable set of block layouts that could arise during execution as a result of resizing.

The resizing process as described in Table 1 deterministically sorts fingerprints from each parent block into its child blocks in such a way that even if a key K's fingerprint F is inserted into a prior version of the filter (i.e., before one or more resizings of the filter), F appears in the correct bucket and block in the resized current version of the filter.

When performing a lookup for a key K (e.g., for a query, insertion, or deletion), the key K's two candidate buckets (calculated by $H_1(K)$ and $H_2(K)$) account for the number of times the filter's capacity has been doubled, as indicated by the resize counter value R. When a fingerprint is relocated from its current bucket to its alternate bucket in a filter that has already been resized, the computation of the offset between the two alternate buckets for the fingerprint is scaled based on R. The resizing technique allows for the computation of the candidate buckets and blocks in which a fingerprint would have been stored in the original unresized block store (i.e., when R=0). These bucket and block indexes are scaled to their correct values for the current size of the block store using the current value of R. In other words, keeping track of the resize counter value R allows multiple views (corresponding to different sizes) of the table to be maintained, including the original unresized base view; that is, R can be used to revert the filter to any of the prior views.

Each bucket in the block store has a unique global bucket index glbi, which references its location in the block store. For a fingerprint F, the block index bi identifying the block containing F can be calculated as glbi/B (where B is the number of buckets in each block). The block-local bucket index lbi identifying which bucket within block bi contains F is calculated as lbi=glbi%B.

When calculating an alternate candidate bucket for a fingerprint F in a filter that has been doubled in size R times, the existing block index bi of the bucket currently containing F is right shifted by R (i.e., divided by $2^R$). This computation yields the fingerprint's block index bi0 were it to be placed in the original version of the filter. In actuality, the fingerprint F could have been inserted after one or more resizings of the filter, but bi0 provides a common point of reference.

As previously explained, the alternate bucket hash H'(F, B) is executed on a fingerprint F being relocated and its bucket B to compute the alternate bucket for the fingerprint F. To calculate an alternate bucket for a fingerprint F in a bucket $B_1$ in a filter that was previously resized, H' is executed on 1) the fingerprint F of key K, and 2) the bucket index glbi0 that the fingerprint F would have in the original filter. This provides the index of the alternate bucket that F would have in the original filter (i.e., when R=0). This original alternate bucket index is scaled for the current value of R in the already resized filter. To scale the value for the resized filter, lbi is subtracted from the original alternate bucket index and the result is multiplied by $2^R$, which is equivalent to left shifting by R.

This computation yields the global bucket index for the zeroth child block's zeroth bucket, where the zeroth child block is descended from the original block that would contain F in the unresized filter. To this global bucket index, the local bucket index lbi is added back along with B times the R most significant bits of the fingerprint F. This places F in the correct bucket of the $(F>>(f-R))\&((1<<R)-1)$th child block (identified by the child number child in Table 1), where f is the number of bits per fingerprint. This process is expressed below in Equation 1.

$$H'_R(glbi,x)=((H'(glbi_0,x)-lbi)<<R)+B\times((F>>(f-R))\& \qquad \text{(Equation 1)}$$
$$((1<<R)-1))+lbi$$

where:
  bi=glbi/B
  bi0=bi>>R
  glbi0=bi0×B+lbi

In Equation 1, bi is the current block index, bi0 is the block index in the original filter, and glbi0 is the bucket index in the original filter. Equation 2 shows how to compute the new version of $H_1$ (called $H_{1R}$) for a Morton filter currently having a block store that is $2^R$ times its initial capacity.

$$H_{1R}(K)=((H_1(K)-lbi)<<R)+B\times((F>>(f-R))\& \qquad \text{(Equation 2)}$$
$$((1<<R)-1))+lbi$$

Applying $H'_R$ to $H_{1R}$ yields the new $H_2$ called $H_{2R}$ (i.e., $H_{2R}(K)=H'_R(H_{1R}(K), F)$).

For a cuckoo filter that does not organize its buckets into blocks, the bucket index computation logic is simplified. Such a non-blocked cuckoo filter is treated similar to a blocked filter in which each block contains only one bucket rather than multiple buckets. In a Morton filter, which has buckets grouped in blocks, the resizing mechanism distributes each bucket's fingerprints among two adjacent child blocks for each doubling of the capacity of the Morton filter. In a non-blocked cuckoo filter, the resizing mechanism instead maps a parent bucket's fingerprints to two adjacent child buckets in the new resized filter.

Thus, a fingerprint's child bucket is computed by multiplying its parent bucket's global index by two and adding the value of the Rth most significant bit of the fingerprint. For example, a bucket with index 5 (0b101) in the parent filter and containing fingerprints 0b101011, 0b011100, and 0b010101 when R=0 would map fingerprints 0b011100 and 0b010101 to a child bucket at index 10 (0b1010) and 0b101011 to a child bucket at index 11 (0b1011). As with Morton filters, variants of $H_{1R}$, $H_{2R}$, and $H'_R$ similarly scale the initial outputs of $H_1$, $H_2$, and H' to their correct values in the resized version of the filter.

Figure 5:
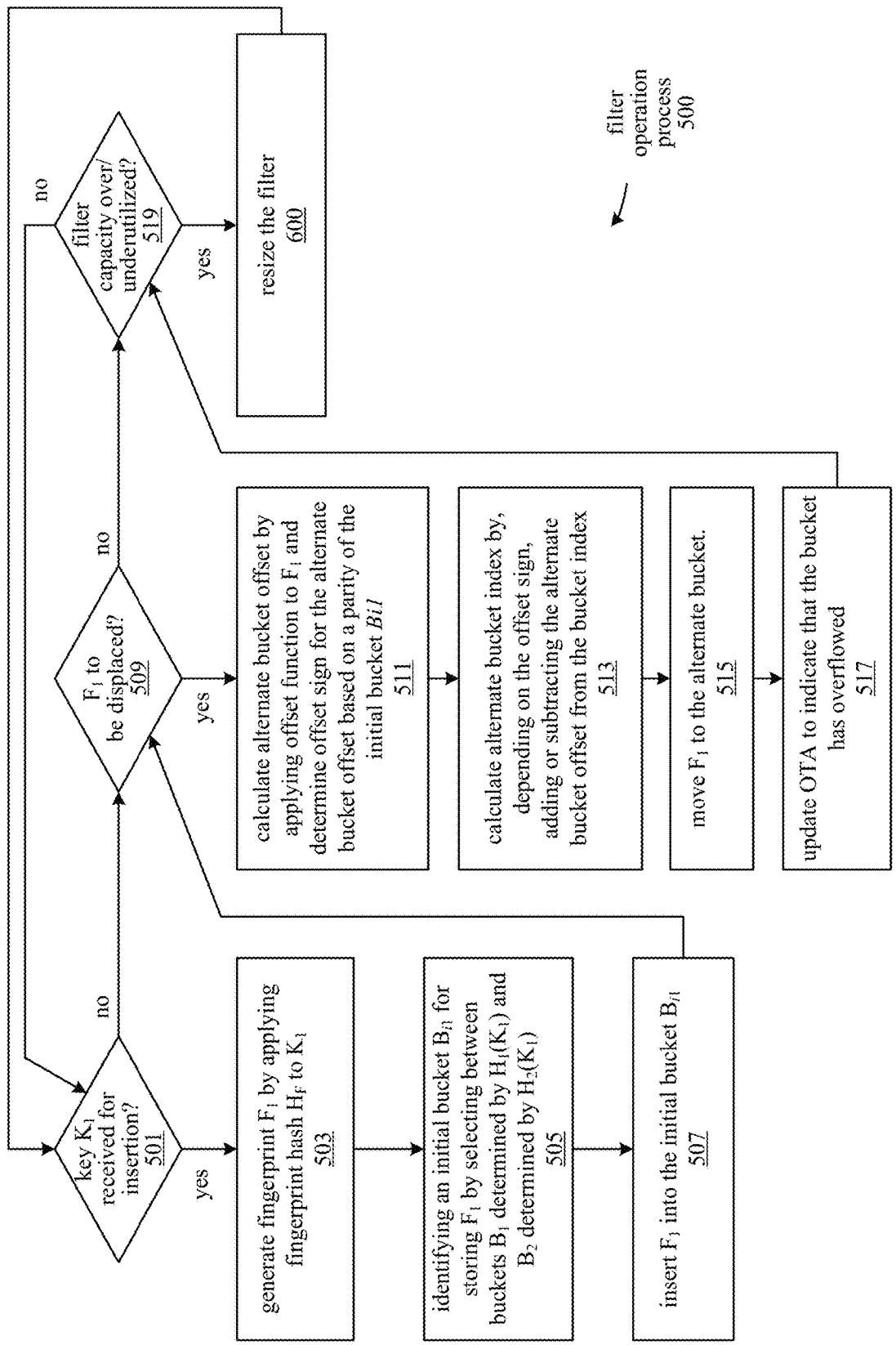
FIG. 5 is a flow diagram illustrating a process for operating a probabilistic filter, according to an embodiment.

FIG. 5 illustrates a process 500 for operating and maintaining a probabilistic filter such as a Morton filter, according to an embodiment. The process 500 is performed by components in the computing system 200, such as the insertion logic 306, hash module 301, lookup logic 309, OTA 310, FSA 311, FCA 312, etc., illustrated in FIGS. 2 and 3.

At block 501, if a key $K_1$ for insertion into the filter is received by the insertion logic 306, the process 500 continues at block 503. At block 503, in response to receiving the key $K_1$ for adding to the probabilistic filter, the hash module 301 generates a fingerprint $F_1$ by applying the fingerprint hash function $H_F$ to the key $K_1$.

At block 505, the insertion logic 306 identifies an initial bucket $B_{i1}$ for storing the fingerprint $F_1$ by selecting between a first candidate bucket $B_1$ and a second candidate bucket $B_2$. The first candidate bucket $B_1$ is determined using the bucket hash function $H_1(K_1)$, and the second candidate bucket $B_2$ is determined using the bucket hash function $H_2(K_1)$. The insertion logic 306 selects the first candidate bucket $B_1$ if the bucket $B_1$ has an available slot that is not already occupied by another fingerprint. If bucket $B_1$ is full, the insertion logic 306 selects $B_2$ as the initial bucket $B_{i1}$. If both $B_1$ and $B_2$ are full, then a fingerprint already in $B_1$ or $B_2$ is relocated to its own alternate bucket, and the candidate bucket (either $B_1$ or $B_2$) from which it was removed is selected to receive the fingerprint $F_1$. At block 507, the fingerprint $F_1$ is inserted into the selected initial bucket $B_{i1}$.

The key $K_1$ is thus added to the filter, and its fingerprint $F_1$ remains in the selected bucket $B_{i1}$ where it can be found when a lookup of $K_1$ is subsequently performed. The fingerprint $F_1$ is subsequently displaced from its bucket $B_{i1}$ when $B_{i1}$ is full and a subsequent insertion causes a new fingerprint to be inserted in $B_{i1}$, or causes an existing fingerprint to be moved into $B_{i1}$. The process 500 arrives at block 509 from block 507, or from block 501 when there is no insertion. When $F_1$ is to be displaced, then at block 509, the process 500 continues at block 511.

At block 511, an offset function (e.g., the alternate bucket hash H') along with the resize counter value R is used to determine an alternate bucket for the fingerprint $F_1$. The offset function is applied to the fingerprint $F_1$ to calculate an alternate bucket offset, which represents a distance between the bucket containing $F_1$ and the alternate bucket. An offset sign is determined by the parity of $F_1$'s containing bucket, and indicates whether the index of the alternate bucket is greater or less than the index of the containing bucket.

For even/odd alternate bucket hashing, the offset function calculation gives the same offset for each of the pair of alternate buckets, and the offset sign is determined based on the parity of the bucket index. Thus, the alternate bucket computation for each bucket points to the other alternate bucket. For resizable filters, the original alternate bucket offset (as calculated for the original sized filter) is additionally scaled using the resize counter value R, as previously described with reference to Equation 1.

At block 513, the alternate bucket index is calculated by, depending on the offset sign, adding or subtracting the alternate bucket offset from the current bucket index. At block 515, the fingerprint $F_1$ is moved to its alternate bucket at the calculated index. The OTA for the block is updated to indicate that the bucket from which $F_1$ was removed has overflowed. In the process 500 as illustrated, the key $K_1$ and its fingerprint $F_1$ generally represent any key and fingerprint that is added to the filter; thus, the operations of blocks 501-517 are also performed when inserting and displacing other fingerprints in the filter.

The process 500 arrives at block 519 from block 517, or from block 509 if $F_1$ is not being displaced. At block 519, if the filter capacity is overutilized or underutilized, then the filter is resized at block 600. In one embodiment, the filter capacity is overutilized when the amount of space occupied by fingerprints exceeds a threshold large fraction of the space available in the filter, and is underutilized when the amount of occupied space is less than a threshold smaller fraction (e.g., at least less than half) of the available space. Whether or not the filter is resized can also depend on other factors, such as application priority, how long the space thresholds have been exceeded, user input, etc. When the filter capacity is underutilized (i.e., the fingerprints occupy much less space than the total capacity of the filter) the filter is resized (e.g., halved) to a smaller capacity at block 600. When the filter capacity is overutilized (i.e., the fingerprints occupy nearly the total capacity of the filter or more) the filter is increased (e.g., doubled) in size at block 600.

The process 500 returns to block 501 from block 600 or, if the filter is not over- or underutilized, from block 519. The operations of blocks 501-600 thus repeat to add and displace multiple fingerprints in the filter, along with other operations such as lookups, deletions, etc. These operations are supported even after the filter has been resized one or multiple times, and whether the filter is increased or decreased in size.

For example, after resizing 600 of the filter, blocks 501-507 are executed to add a second key $K_2$ to the filter by generating its fingerprint $F_2$ at block 503 based on applying the fingerprint hash function $H_F$ to the key $K_2$. At block 505, an initial bucket $B_{i2}$ is identified for the fingerprint $F_2$ by selecting between a candidate bucket $B_3$ determined based on the updated resize counter value R and performing the first bucket hash function $H_1$ on the key $K_2$ and a candidate bucket $B_4$ determined based on the updated resize counter value R and performing the second bucket hash function $H_2$ on the key $K_2$. At block 507, the fingerprint $F_2$ is inserted into the selected bucket $B_{i2}$. For this insertion, R has been updated by the resizing operation 600 so the candidate buckets are correctly calculated for the current size of the filter.

The updated resize counter value R is also used to scale the alternate bucket computations after the resize operation 600 when a fingerprint is displaced. Blocks 509-517 are thus executed when relocating a fingerprint (e.g., fingerprint $F_1$) as previously described, but using the updated value of R.

Figure 6:
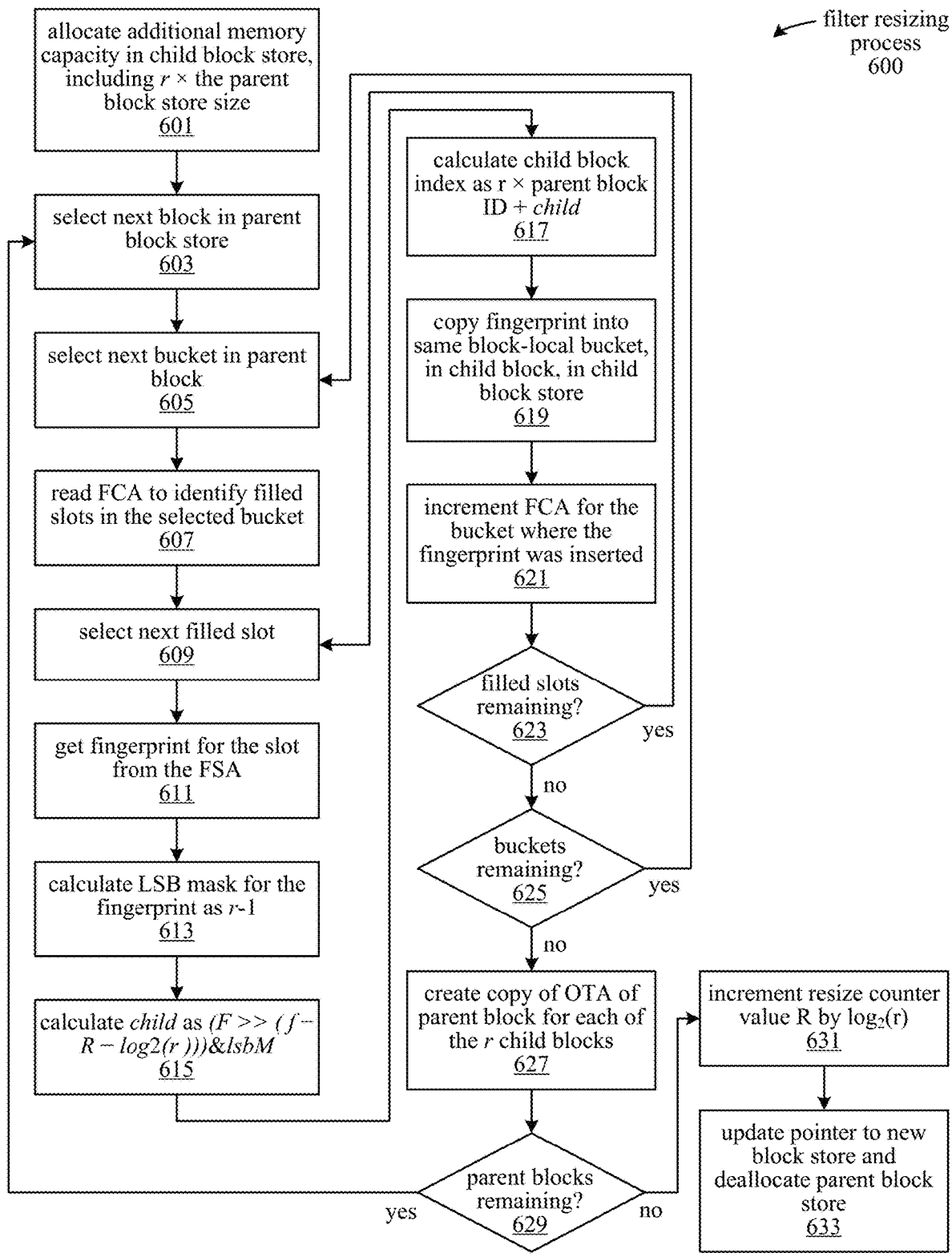
FIG. 6 is a flow diagram illustrating a process for resizing a probabilistic filter, according to an embodiment.

FIG. 6 is a flow diagram illustrating a process 600 for resizing a probabilistic filter such as a Morton filter, according to an embodiment. The process 600 is performed by components in the computing system 200, such as the insertion logic 306, hash module 301, lookup logic 309, OTA 310, FSA 311, FCA 312, etc., illustrated in FIGS. 2 and 3. In one embodiment, the operations in process 600 correspond to the resizing routine shown in Table 1.

At 601, the process 600 allocates additional memory capacity by creating a child block store, which includes r times the capacity of the parent block store. This allocation corresponds to line 3 in Table 1. For each block in the parent block store, the process 600 creates r child blocks each containing the same number of buckets and having the same memory capacity as the parent block.

In Table 1, the loop defined in lines 4-20 corresponds to the operations in 603-629, which iterate through each block in the parent block store. The loop defined in lines 7-17 of Table 1 correspond to the operations in 605-625 and iterate through each bucket in a particular parent block. At 607, the FCA 311 is used to identify the filled slots in the current bucket. The loop defined in lines 9-17 correspond to the operations 609-623, which iterate through each of the filled slots in the bucket. At 609, the next filled slot is selected from among the filled slots as identified by the FCA 311. The fingerprint stored in the slot is obtained from the FSA 311, as provided at 611.

At 613 (corresponding to line 12 in Table 1), the least significant bit mask lsbM is calculated by subtracting 1 from the resize factor r. The child number child is calculated as (F>>(f−R−$\log_2$(r)))&lsbM as provided at 615, corresponding to line 13 in Table 1. The process 600 thus selects a child block for the fingerprint based on a subset of the bits in the fingerprint itself, where the subset of bits used is determined based on the resize counter value R and the resize factor r for the current resizing operation. At 617, corresponding to line 14 in Table 1, the child block index is calculated by multiplying the resize factor r by the block identifier of the parent block and adding the child number child. The operations in 613-617 thus determine a destination bucket and block for the fingerprint based on a value of the fingerprint and the resize counter value R.

At 619, the fingerprint is copied into the child block identified by the child block index that was calculated at block 617. In this child block, the fingerprint is stored in the same block-local bucket index as the parent; for example, a fingerprint that had been in bucket 1 of the parent block is stored in bucket 1 of the child block. At 621, the FCA value for the bucket where the fingerprint was inserted is incremented to maintain a count of the total number of fingerprints in the bucket. The operations at 619 and 621 correspond to lines 15 and 16 of Table 1, respectively.

At 623, if any filled slots are remaining in the parent block that have not yet been processed, the process 600 returns to 609. The operations of 609-623 repeat for each fingerprint in the currently selected parent block to determine a destination bucket and block for the fingerprint and copy the fingerprint to the corresponding bucket in the new child block. For each child block an FCA for each child block is thus created and updated to record the number of fingerprints in each bucket of the child block.

At 625, if any buckets are remaining in the currently selected parent block that have not yet been processed, the process 600 returns to block 605 to select the next bucket for processing. The operations of 605-625 thus repeat until all of the buckets in the selected parent block have been processed. If all of the buckets in the parent block have been processed, then the process 600 continues at 627. At 627, corresponding to lines 18-20 in Table 1, a copy of the OTA of the parent block is created for each of the r child blocks descending from the parent block.

At 629, if any parent blocks are remaining in the parent block store that have not yet been processed, the process 600 returns to block 603. The operations of 603-629 repeat until all of the parent blocks in the block store have been processed, and the process continues from 629 to 631. At 631, corresponding to line 21 in Table 1, the resize counter value R is incremented by $\log_2$(r), so that each increment of R indicates a doubling of the filter capacity. At 633, corresponding to lines 22-23 of Table 1, the pointer MF.BlockStore referring to the block store for the Morton filter is updated to refer to the new block store newBS so that application using the filter access the new child block store having the increased capacity.

The filter resizing process 600 is similarly invoked, with some modifications, to reduce the capacity of a filter, e.g., in response to underutilization of the filter's memory capacity. As an example, when r is equal to ½, the capacity of the filter is halved (newBS is half the size of oldBS) and R is decremented by 1. At 601, allocating r times the capacity of the parent block store means that two parent blocks are reduced to a single child block. A doubling in the filter size creates two adjacent child blocks for each parent block; accordingly, halving the filter size combines two adjacent parent blocks into a single child block. Thus, the filter resizing process 600 iterates through the parent blocks in the filter, their buckets, and their fingerprints, and instead of the calculations in 613-617, copies the fingerprints from each group of 1/r adjacent parent blocks into the same child block in the new reduced-capacity block store.

The FCA of the child block is incremented as each fingerprint is added to the buckets in the child block, as provided at 621. At 627, instead of copying the OTA, the OTAs from the multiple parent blocks are combined via a bitwise OR operation into an OTA for the child block.

The resizing process 600 is additionally able to reduce a filter's capacity to smaller than its original size (i.e., when R=0) when the original filter size has a power of two number of blocks. In this case, reducing the filter capacity to less than the original capacity results in a negative value of R (e.g., −1, −2, etc.) corresponding to a fractional resize factor r (e.g., ½, ¼, etc., respectively).

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 200 and/or portions thereof carried on the computer-readable storage medium may be a database or other data structure which can be read by a program and used, directly or indirectly, to fabricate the hardware including the computing system 200. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 200. The netlist may then be placed and routed to produce a data set describing geometric shapes to be applied to masks. The masks may then be used in various semiconductor fabrication steps to produce a semiconductor circuit or circuits corresponding to the computing system 200. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method of maintaining a compressed probabilistic filter in a computing system, the method comprising:
    storing the compressed probabilistic filter in the computing system as a data structure;
    in response to receiving a key $K_1$ for adding to the compressed probabilistic filter,
        generating a fingerprint $F_1$ based on applying a fingerprint hash function $H_F$ to the key $K_1$;
    inserting the fingerprint $F_1$ into an initial bucket $B_{i1}$ of the compressed probabilistic filter, wherein the initial bucket $B_{i1}$ is selected between at least a first bucket $B_1$, determined based on a first bucket hash function $H_1$ of the key $K_1$, and a second bucket $B_2$, determined based on a second bucket hash function $H_2$ of the key $K_1$; and
    resizing the compressed probabilistic filter based on an application executing on the computing system, wherein resizing the compressed probabilistic filter comprises, for each parent block in the compressed probabilistic filter:
        creating a child block in the compressed probabilistic filter, and
        storing, in the computing system, a respective fullness counter array for the child block, the respective fullness counter array indicating a respective number of fingerprints for each bucket of the child block.

2. The method of claim 1, further comprising, after the resizing, adding a second key $K_2$ to the compressed probabilistic filter by:
    generating a fingerprint $F_2$ based on applying the fingerprint hash function $H_F$ to the key $K_2$; and
    inserting the fingerprint $F_2$ into an initial bucket $B_{i2}$ of the compressed probabilistic filter, wherein the initial bucket $B_{i2}$ is selected between a third bucket $B_3$ determined based on a resize counter value and a first bucket hash function $H_1$ of the key $K_2$, and a fourth bucket $B_4$ determined based on the resize counter value and a second bucket hash function $H_2$ of the key $K_2$.

3. The method of claim 1, wherein:
    resizing the compressed probabilistic filter further comprises:
        incrementing a resize counter value; and
        inserting the fingerprint $F_1$ into a bucket B' in the compressed probabilistic filter based on a value of the fingerprint $F_1$ and the resize counter value; and
    each increment of the resize counter value corresponds to a doubling in size of the compressed probabilistic filter.

4. The method of claim 1, further comprising reducing a capacity of the compressed probabilistic filter by:
    combining a plurality of fingerprints from multiple buckets into a single bucket in the compressed probabilistic filter;
    decrementing a resize counter value; and
    reducing an amount of memory capacity allocated for storing the compressed probabilistic filter.

5. The method of claim 1, wherein resizing the compressed probabilistic filter further comprises, for each parent block in the compressed probabilistic filter:
    creating a plurality of child blocks each containing a number of buckets equal to a number of buckets in the parent block and having a memory capacity equal to a memory capacity of the parent block; and
    distributing fingerprints from the parent block among the plurality of child blocks by, for each fingerprint in the parent block, selecting a child block of the plurality of child blocks for the fingerprint based on a subset of bits in the fingerprint, wherein the subset of bits is determined based on a resize counter value.

6. The method of claim 5, further comprising, for each parent block in the compressed probabilistic filter:
    prior to the resizing, updating an overflow tracking array to indicate for each bucket of a plurality of buckets in the parent block whether an overflow has occurred,
    wherein the resizing the compressed probabilistic filter further comprises creating a copy of the overflow tracking array of the parent block for each child block of the plurality of child blocks of the parent block.

7. The method of claim 1, wherein the resizing of the compressed probabilistic filter allows for caching of the compressed probabilistic filter closer to a processing unit of the computing system that is executing the application.

8. The method of claim 1, further comprising, after the resizing:
    moving the fingerprint $F_1$ to an alternate bucket for the fingerprint $F_1$ based on applying an offset function to the fingerprint $F_1$ and based on a resize counter value.

9. The method of claim 8, wherein:
    the resizing the compressed probabilistic filter further comprises determining a bucket B' for the fingerprint $F_1$ based on a value of the fingerprint $F_1$ and the resize counter value; and
    the method further comprises, after the resizing, calculating an index of the alternate bucket by:
        determining an offset sign for an alternate bucket offset based on a parity of an index of the initial bucket $B_{i1}$, wherein the alternate bucket offset is calculated by the applying of the offset function to the fingerprint $F_1$ and represents a distance between the bucket B' and the alternate bucket; and
        based on the alternate bucket offset and the bucket B', performing one of an addition operation and a subtraction operation selected based on the offset sign.

10. A computing device, comprising:
a hash module circuit configured to, in response to receiving a key K for insertion into a compressed probabilistic filter that is stored in a memory of the computing device as a data structure, generate a fingerprint F based on applying a fingerprint hash function to the key K;
an insertion logic coupled with the hash module circuit and configured to:
add the key K to the compressed probabilistic filter by:
inserting the fingerprint F into an initial bucket B of the compressed probabilistic filter, wherein the initial bucket B is selected between at least a first bucket $B_1$, determined based on a first bucket hash function $H_1$ of the key K, and a second bucket $B_2$ determined based on a second bucket hash function $H_2$ of the key K; and
resize the compressed probabilistic filter based on an application executing on the computing device, wherein resizing the compressed probabilistic filter comprises, for each parent block in the compressed probabilistic filter:
creating a child block in the compressed probabilistic filter, and
storing, in the computing device, a respective fullness counter array for the child block, the respective fullness counter array indicating a respective number of fingerprints for each bucket of the child block.

11. The computing device of claim 10, further comprising:
a memory management logic coupled with the insertion logic and configured to:
during the resizing of the compressed probabilistic filter, allocate additional memory capacity for storing the compressed probabilistic filter; and
insert the fingerprint F into a bucket B' by storing the fingerprint F in the additional memory capacity.

12. The computing device of claim 10, wherein the insertion logic is further configured to reduce a capacity of the compressed probabilistic filter by:
combining a plurality of fingerprints from multiple buckets into a single bucket in the compressed probabilistic filter;
decrementing a resize counter; and
reducing an amount of memory capacity allocated for storing the compressed probabilistic filter.

13. The computing device of claim 10, wherein the compressed probabilistic filter is further configured to, for each parent block in the compressed probabilistic filter:
create one or more child blocks each containing a number of buckets equal to a number of blocks in the parent block and a memory capacity equal to a memory capacity of the parent block; and
distribute fingerprints from the parent block among the one or more child blocks.

14. The computing device of claim 13, further comprising:
for each parent block in the compressed probabilistic filter, a respective overflow tracking array configured to indicate for each bucket of a plurality of buckets in a corresponding parent block whether an overflow has occurred,
wherein the insertion logic is further configured to resize the compressed probabilistic filter by, for each parent block in the compressed probabilistic filter, creating a copy of the respective overflow tracking array associated with the parent block for each child block of the one or more child blocks of the parent block.

15. The computing device of claim 10, wherein:
the respective fullness counter array of a corresponding child block stores the respective number of fingerprints for each bucket of the child block in a sequential order of the buckets.

16. The computing device of claim 10, wherein the insertion logic is further configured to, after the resizing:
move the fingerprint F to an alternate bucket for the fingerprint F based on applying an offset function to the fingerprint F and based on a resize counter value.

17. The computing device of claim 16, wherein the resizing the compressed probabilistic filter further comprises determining a bucket B' for the fingerprint F based on a value of the fingerprint F and the resize counter value, and wherein the insertion logic is further configured to, after the resizing, calculate an index of the alternate bucket by:
determining an offset sign for an alternate bucket offset based on a parity of an index of the initial bucket B, wherein the alternate bucket offset is calculated by the applying of the offset function to the fingerprint F and represents a distance between the bucket B' and the alternate bucket; and
based on the alternate bucket offset and the bucket B', performing one of an addition operation and a subtraction operation selected based on the offset sign.

18. A computing system, comprising:
a memory device configured to store a compressed probabilistic filter as a data structure;
a processing unit coupled with the memory device and configured to:
in response to receiving a key K for adding to the compressed probabilistic filter,
generate a fingerprint F based on applying a fingerprint hash function to the key K; and
add the key K to the compressed probabilistic filter by:
inserting the fingerprint F into an initial bucket B of the compressed probabilistic filter, wherein the initial bucket B is selected between at least a first bucket $B_1$ determined based on a first bucket hash function $H_1$ of the key K and a second bucket $B_2$ determined based on a second bucket hash function $H_2$ of the key K; and
resize the compressed probabilistic filter based on an application executing on the computing system, wherein resizing the compressed probabilistic filter comprises, for each parent block in the compressed probabilistic filter:
creating a child block in the compressed probabilistic filter, and
storing, in the computing system, a respective fullness counter array for the child block, the respective fullness counter array indicating a respective number of fingerprints for each bucket of the child block.

19. The computing system of claim 18, wherein:
the memory device is further configured to, during the resizing of the compressed probabilistic filter, allocate additional memory capacity for storing the compressed probabilistic filter; and the resizing the compressed probabilistic filter further comprises:
inserting the fingerprint F into a bucket B' in the compressed probabilistic filter for the fingerprint F based on a value of the fingerprint F and a resize counter value.

20. The computing system of claim 18, wherein
the memory device further comprises:
a fingerprint storage array configured to store a plurality of fingerprints including the fingerprint F; and
an overflow tracking array configured to, for each parent block in the compressed probabilistic filter, store indications of whether each bucket of a plurality of buckets in the parent block has overflowed; and
wherein the resizing the compressed probabilistic filter further comprises, for each parent block of a plurality of parent blocks in the compressed probabilistic filter:
creating a plurality of child blocks for the parent block; and
creating a copy of the overflow tracking array of the parent block for each of the plurality of child blocks.

\* \* \* \* \*